(12) United States Patent
Uemura (10) Patent No.: US 10,978,233 B2
(45) Date of Patent: Apr. 13, 2021

(54) SOLENOID HAVING A BARRIER BETWEEN A SOLENOID HOUSING AND PACKAGE (71) Applicant: EAGLE INDUSTRY CO., LTD., Tokyo (JP)

(72) Inventor: Jun Uemura, Tokyo (JP)

(73) Assignee: EAGLE INDUSTRY CO., LTD.

(\*) Notice: Subject to any disclaimer, the term of this patent is extended or adjusted under 35 U.S.C. 154(b) by 0 days.

(21) Appl. No.: 16/080,770

(22) PCT Filed: Mar. 27, 2017

(86) PCT No.: PCT/JP2017/012246
§ 371 (c)(1),
(2) Date: Aug. 29, 2018

(87) PCT Pub. No.: WO2017/175611
PCT Pub. Date: Oct. 12, 2017

(65) Prior Publication Data
US 2019/0072202 A1    Mar. 7, 2019

(30) Foreign Application Priority Data

Apr. 8, 2016  (JP) .............................. JP2016-078023

(51) Int. Cl.
*H01F 7/16*     (2006.01)
*H01F 7/128*    (2006.01)
(Continued)

(52) U.S. Cl.
CPC ............. *H01F 7/16* (2013.01); *F02M 51/005* (2013.01); *F16K 27/048* (2013.01); *F16K 31/06* (2013.01);
(Continued)

(58) Field of Classification Search
CPC .......... H01F 7/16; H01F 7/128; H01F 7/1607; F16K 27/048; F16K 31/06; F02M 51/005; F02M 61/168
(Continued)

(56) References Cited

U.S. PATENT DOCUMENTS 6,076,802 A \* 6/2000 Maier ................ F02M 51/0682
251/129.21
6,364,284 B1 \* 4/2002 Imada .................... F16K 1/221
251/248
(Continued)

FOREIGN PATENT DOCUMENTS

CN   103069513 A   4/2013
CN   104 350 271 A  2/2015
(Continued)

OTHER PUBLICATIONS

Extended European Search Report for Patent Application No. EP17778990.6 dated Feb. 28, 2019 (7 pages, plus 31 pages of foreign reference translation).

*Primary Examiner* — John Bastianelli
(74) *Attorney, Agent, or Firm* — Harness, Dickey & Pierce, P.L.C.

(57) ABSTRACT

A solenoid is provided that includes: a primary package that is made of a molding resin and covers a solenoid body in which a coil is wound around a bobbin; and a secondary package that is made of a molding resin and covers the primary package. A contact surface between the primary package and the secondary package is provided with an anchor shape for enhancing joint strength between the primary package and the secondary package. The solenoid includes a connector part for electrifying the coil in addition to the solenoid body, the primary package covers both the solenoid body and the connector part, and the secondary
(Continued)

package covers only a part of the primary package covering the solenoid body.

5 Claims, 7 Drawing Sheets

(51) Int. Cl.
  *F16K 31/06* (2006.01)
  *F02M 51/00* (2006.01)
  *F16K 27/04* (2006.01)
  *F02M 61/16* (2006.01)
(52) U.S. Cl.
  CPC ........... *H01F 7/128* (2013.01); *H01F 7/1607* (2013.01); *F02M 61/168* (2013.01)
(58) Field of Classification Search
  USPC .................................. 251/129.15–129.22
  See application file for complete search history.

(56) References Cited

U.S. PATENT DOCUMENTS

| | | | | |
|---|---|---|---|---|
| 6,601,786 | B2* | 8/2003 | Yamaguchi | F02M 51/0682 |
| | | | | 239/533.9 |
| 6,616,073 | B2* | 9/2003 | Sugiyama | F02M 51/0682 |
| | | | | 239/585.1 |
| 7,089,952 | B2* | 8/2006 | Nakamura | B32B 27/34 |
| | | | | 137/15.01 |
| 7,168,638 | B2* | 1/2007 | Saito | F02M 51/0667 |
| | | | | 239/533.2 |
| 7,293,757 | B2* | 11/2007 | Akabane | F02M 51/005 |
| | | | | 239/585.5 |
| 7,520,449 | B2* | 4/2009 | Matsuo | F02M 51/005 |
| | | | | 239/585.5 |
| 2005/0072950 | A1* | 4/2005 | Tojo | F02M 63/0015 |
| | | | | 251/129.15 |
| 2006/0117553 | A1 | 6/2006 | Tsuge et al. | |
| 2008/0290305 | A1 | 11/2008 | Akabane | |
| 2012/0160938 | A1* | 6/2012 | Saito | F02M 51/065 |
| | | | | 239/585.1 |
| 2013/0195689 | A1 | 8/2013 | Mochizuki | |
| 2015/0152823 | A1 | 6/2015 | Akazaki et al. | |
| 2015/0152824 | A1* | 6/2015 | Akazaki | F02M 51/061 |
| | | | | 239/71 |
| 2015/0302963 | A1* | 10/2015 | Arai | H01F 7/128 |
| | | | | 335/299 |

FOREIGN PATENT DOCUMENTS

| | | |
|---|---|---|
| EP | 2461013 A1 | 6/2012 |
| EP | 2590184 A1 * | 5/2013 |
| EP | 2983277 A2 | 2/2016 |
| JP | H04-257206 A | 9/1992 |
| JP | H10-058480 A | 3/1998 |
| JP | 2002-151327 A | 5/2002 |
| JP | 2014-207846 A | 10/2014 |
| WO | WO-03-056579 A1 | 7/2003 |
| WO | WO-2005-124143 A1 | 12/2005 |
| WO | WO-2012-132730 A1 | 10/2012 |
| WO | WO-2013-183306 A1 | 12/2013 |

* cited by examiner

SOLENOID HAVING A BARRIER BETWEEN A SOLENOID HOUSING AND PACKAGE

CROSS-REFERENCE TO RELATED APPLICATIONS

This application is a U.S. National Stage Application of International Application No. PCT/JP2017/012246, filed on Mar. 27, 2017, and published in Japanese as WO 2017/175611 A1 on Oct. 12, 2017, which claims priority to Japanese Patent Application No. 2016-078023, filed on Apr. 8, 2016. The entire disclosures of the above applications are incorporated herein by reference.

BACKGROUND OF THE INVENTION

Field of the Invention

The present invention relates to a solenoid that is used as a driving source of a solenoid valve for hydraulically or pneumatically controlling device, for example.

Description of the Conventional Art

Figure 6:
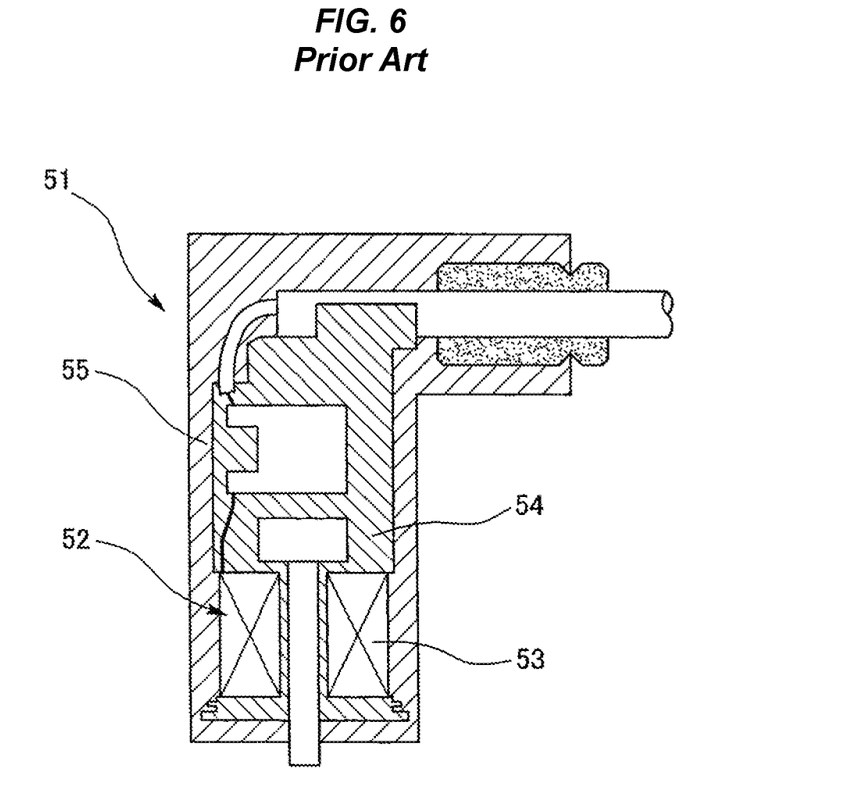
FIG. 6 is a cross-sectional view of a solenoid according to a conventional example.

A known solenoid that has been used to date for this purpose is a solenoid 51 having a configuration including a solenoid body 52 that includes an electromagnetic coil 53 and a bobbin 54 around which the electromagnetic coil 53 is wound and that is covered with a package 55 of a molding resin, as illustrated in FIG. 6.

The package 55 of the molding resin has an electrical isolation property and has the function of protecting the solenoid body 52 against external environments (e.g., dust, moisture, and heat), and is designed in various shapes in accordance with product specifications.

The package 55 of the molding resin is formed (molded) by using a die.

Covering the solenoid body 52 only with the package 55 of the molding resin, however, might cause formation of a gap between the package 55 and a housing (not shown) in attaching the solenoid 51 to the housing, and consequently, external foreign matter might enter the gap to cause a failure in operation of the solenoid 51.

It is therefore an object of the present invention to provide a solenoid structure that can suppress entry of external foreign matter through a gap between a package and a housing to thereby reduce occurrence of a failure in operation of a solenoid.

SUMMARY OF THE INVENTION

To achieve the object, a solenoid according to a first aspect of the present invention includes: a primary package that is made of a molding resin and covers a solenoid body in which a coil is wound around a bobbin; and a secondary package that is made of a molding resin and covers the primary package.

In a solenoid according to a second aspect of the present invention, in the solenoid according to the first aspect described above, a contact surface between the primary package and the secondary package is provided with an anchor shape for enhancing joint strength between the primary package and the secondary package.

In a solenoid according to a third aspect of the present invention, in the solenoid according to the first or second aspects described above, the solenoid includes a connector part for electrifying the coil in addition to the solenoid body, the primary package covers both the solenoid body and the connector part, and the secondary package covers only a part of the primary package covering the solenoid body.

The present invention having the configuration described above includes the secondary package further covering the primary package covering the solenoid body, and thus, the secondary package can close a gap formed between the primary package and the housing or at least can reduce the width of the gap. Thus, it is possible to suppress entering of external foreign matter between the primary package and the housing through the gap.

Although each of the primary package and the secondary package is made of the molding resin, the secondary package is attached after the primary package. Thus, if joint strength between these packages is low, the secondary package might be detached from the primary package (there is a possibility of the presence of a minute gap between the resin of the primary package and the resin of the secondary package, and the resin of the secondary package merely covers the primary package from above and is not coupled to the primary package, and thus, a strong force might cause the resin of the secondary package to be detached from the resin of the primary package). To prevent this, it is preferable to provide the contact surface between these packages with the anchor shape for enhancing joint strength. For example, one of the packages may have a recess and the other package may have a projection so that the recess and the projection are engaged with each other to thereby prevent detachment of the secondary package from the primary package. The shape of the recess is preferably a plurality of holes rather than a continuous groove shape, in terms of easiness in molding and high joint strength.

The secondary package only needs to cover a necessary portion of the outer surface of the primary package. In a case where the solenoid includes a connector part for electrifying the coil in addition to the solenoid body, for example, the primary package covers both the solenoid body and the connector part, and the secondary package covers only the solenoid body, that is, a portion of the primary package covering the solenoid body.

Effect of the Invention

According to the present invention, entering of external foreign matter through a gap between the package and the housing can be suppressed so that occurrence of a failure in operation of the solenoid due to entry of the foreign matter can be thereby reduced.

BRIEF EXPLANATION OF THE DRAWINGS

FIGS. 4A and 4B are views illustrating a solenoid according to a third embodiment of the present invention, where

DETAILED DESCRIPTION OF PREFERRED EMBODIMENTS

Embodiments of the present invention will be described hereinafter, and for convenience of description, a solenoid 1 according to a comparative example will be first described.

Comparative Example

Figure 7:
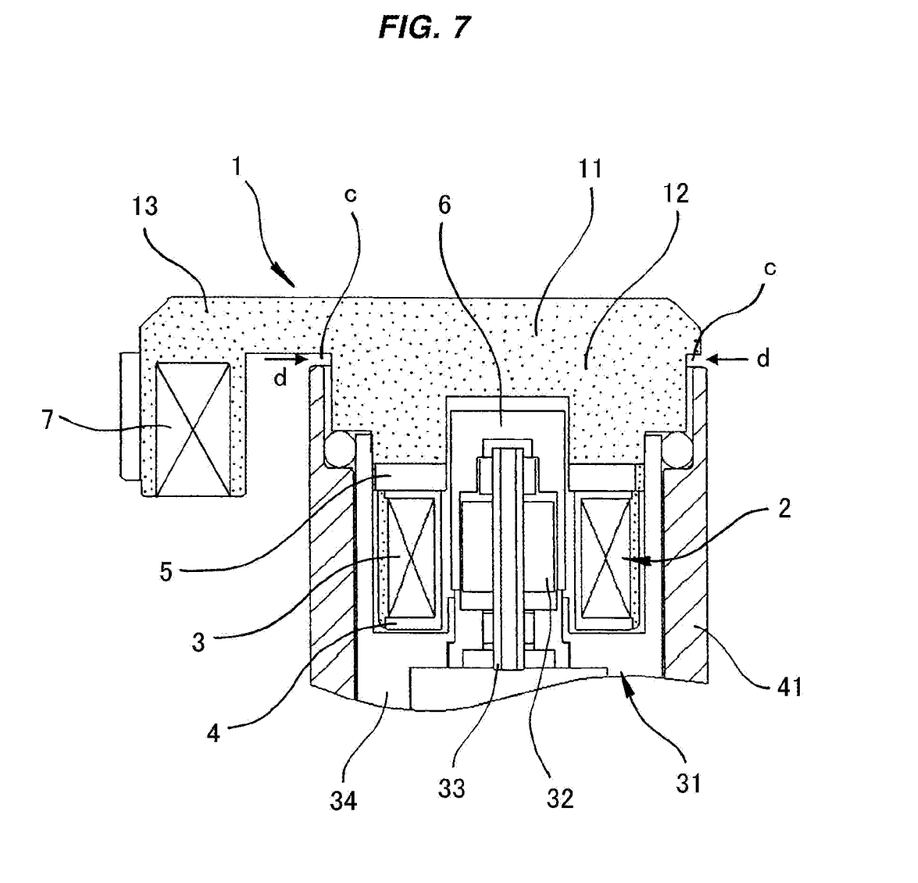
FIG. 7 is a cross-sectional view illustrating a state in which a housing is equipped with a solenoid according to a comparative example.

Specifically, FIG. 7 illustrates a state in which the solenoid 1 according to the comparative example is attached to an opening portion of the upper end of a cylindrical housing 41 together with a valve operating part 31.

The solenoid 1 according to the comparative example includes: a solenoid body 2 including an electromagnetic coil 3, a bobbin 4, a yoke 5, a fixed iron core 6, and so forth; and a connector part 7 for electrifying the coil 3. These components are covered (formed by molding) with a primary package 11 of a predetermined molding resin. Thus, the primary package 11 integrally includes a disc-shaped (turned-down-cup-shaped) first covering portion 12 covering the outer peripheral surface and the upper surface of the solenoid body 2, and a flange-shaped second covering portion 13 covering the connector part 7 with the lower surface of the connector part 7 exposed.

When the solenoid 1 is attached to the opening portion of the upper end of the cylindrical housing 41 together with the valve operating part 31 including a movable iron core 32, a valve shaft 33, a valve body 34, and so forth, the illustrated state is obtained. At this time, a gap c is formed between the primary package 11 and the upper end of the housing 41. Accordingly, external foreign matter (not shown) might enter the gap c (indicated by arrow d) to cause a failure in operation of the solenoid 1. In view of this, a solenoid 1 according to an embodiment of the present invention additionally has the following configuration.

First Embodiment

Figure 1:
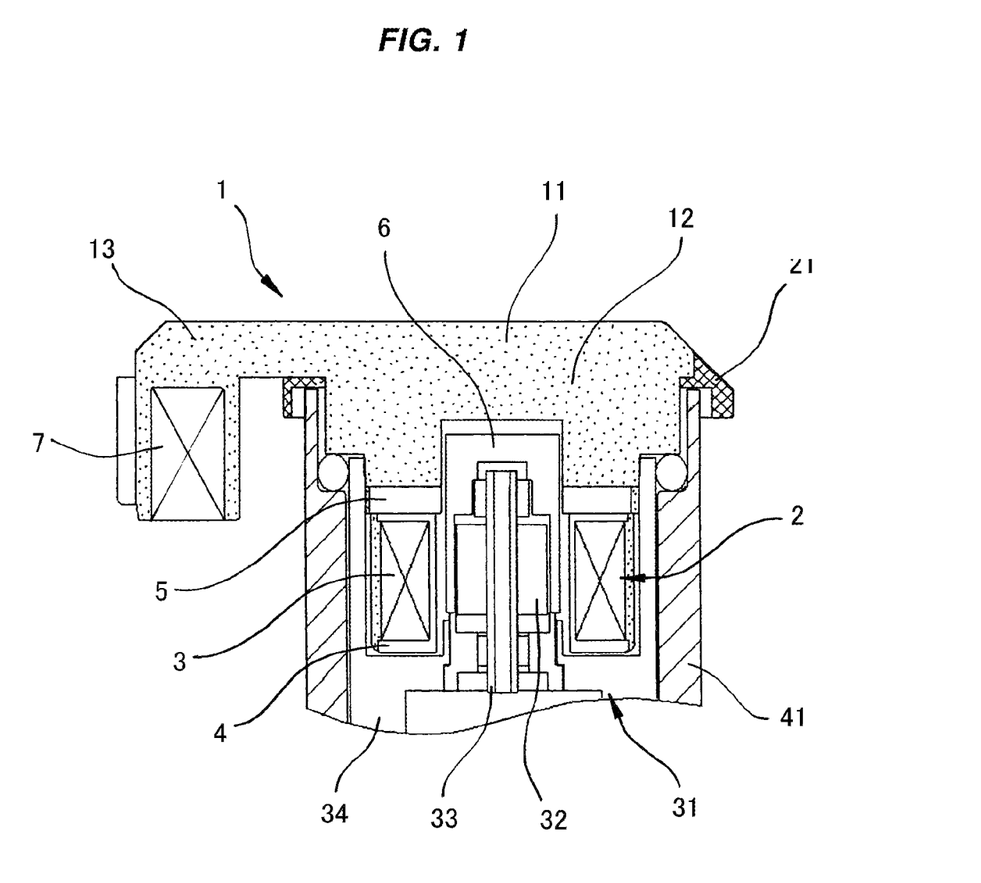
FIG. 1 is a cross-sectional view illustrating a state in which a housing is equipped with a solenoid according to a first embodiment of the present invention.

Specifically, as illustrated in FIG. 1, the primary package 11 covering the solenoid body 2 including the electromagnetic coil 3, the bobbin 4, and so forth is further covered with a secondary package 21, and this secondary package 21 closes the gap c between the primary package 11 and the top portion of the housing 41.

The secondary package 21 is molded by using a predetermined molding resin. The secondary package 21 covers not the entire primary package 11 but a part of the primary package 11, specifically, covers only an outer peripheral edge portion of the disc-shaped first covering portion 12 in the primary package 11 to form a canopy shape for the first covering portion 12.

Materials for the primary package 11 and the secondary package 21 are of the same type, but may be of different types in some operating conditions and environments.

Since the solenoid 1 having the foregoing configuration includes the secondary package 21 that further covers the primary package 11 covering the solenoid body 2, the gap c between the primary package 11 and the upper end of the housing 41 can be closed by the secondary package 21. Accordingly, entering of external foreign matter through the gap c between the primary package 11 and the housing 41 can be suppressed so that occurrence of a failure in operation of the solenoid 1 due to entry of the foreign matter can be thereby reduced.

Second Embodiment

Figure 2:
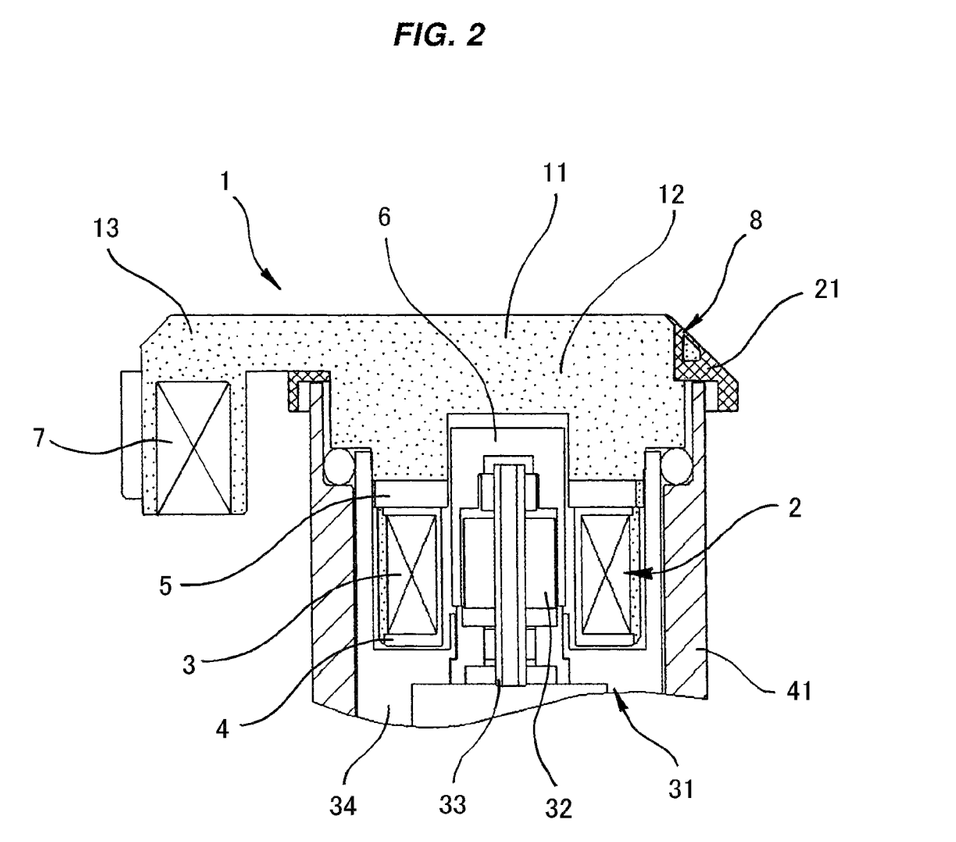
FIG. 2 is a cross-sectional view illustrating a state in which a housing is equipped with a solenoid according to a second embodiment of the present invention.

In a solenoid 1 illustrated in FIG. 2 as a second embodiment, a contact surface between the primary package 11 and the secondary package 21 is provided with an anchor shape 8 for enhancing joint strength between these packages, in addition to the configuration according to the first embodiment. The anchor shape 8 is configured in the following manner.

Figure 3:
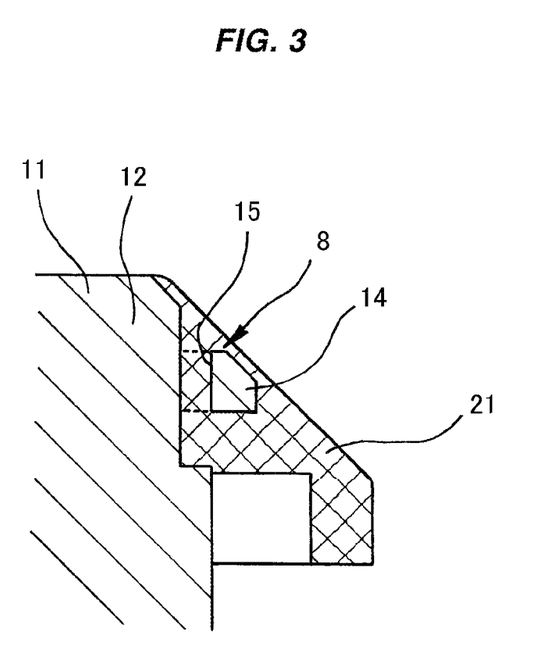
FIG. 3 is an enlarged cross-sectional view illustrating a main portion of the solenoid.

That is, as illustrated in FIG. 3 in an enlarged manner, a flange portion 14 covered with the secondary package 21 is integrally provided on the outer peripheral surface of the disc-shaped first covering portion 12 in the primary package 11, and the flange portion 14 has a plurality of through holes 15 arranged along the circumference so that the through holes 15 are filled with a part of the molding resin constituting secondary package 21, and thereby, the flange portion 14 serves as a pull-out stopper.

Accordingly, with this configuration, since the contact surface between the primary package 11 and the secondary package 21 is provided with the anchor shape 8 for enhancing joint strength between these packages, it is possible to prevent the secondary package 21 from falling off to be detached from the primary package 11.

Third Embodiment

The anchor shape 8 may take various possible shapes, and may have the following shape, for example.

Figure 4A:
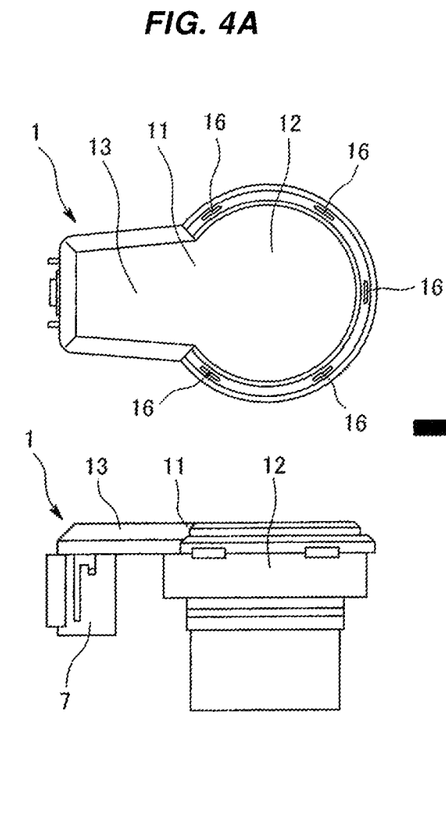
FIG. 4A shows a plan view and a front view illustrating a state after covering with a primary package and before covering with a secondary package.
Figure 4B:
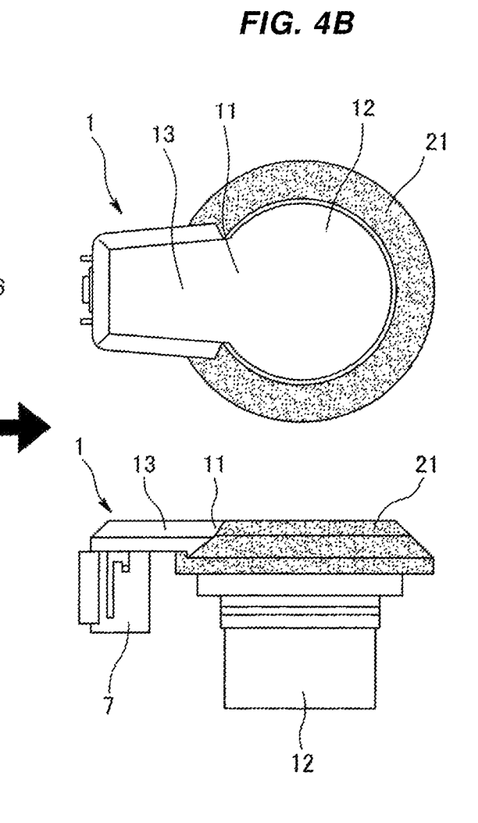
FIG. 4B shows a plan view and a front view illustrating a state after the covering with the primary package and covering with the secondary package.

In a solenoid 1 illustrated in FIGS. 4A and 4B as a third embodiment, the contact surface between the primary package 11 and the secondary package 21 is provided with the anchor shape 8 for enhancing joint strength between these packages, in addition to the configuration according to the first embodiment. The anchor shape 8 is configured in the following manner.

Specifically, as illustrated in the plan view of FIG. 4A, the upper surface of the outer peripheral edge portion of the disc-shaped first covering portion 12 in the primary package 11 has a plurality of (five in the Figure) bottomed holes 16 arranged along the circumference, and each of the holes 16 is filled with a part the molding resin constituting the secondary package 21 (not shown) so that the holes 16 serve as pull-out stoppers.

Accordingly, with this configuration, since the contact surface between the primary package 11 and the secondary package 21 is provided with the anchor shape 8 for enhancing joint strength between these packages, it is possible to prevent the secondary package 21 from falling off to be detached from the primary package 11.

Figure 5A:
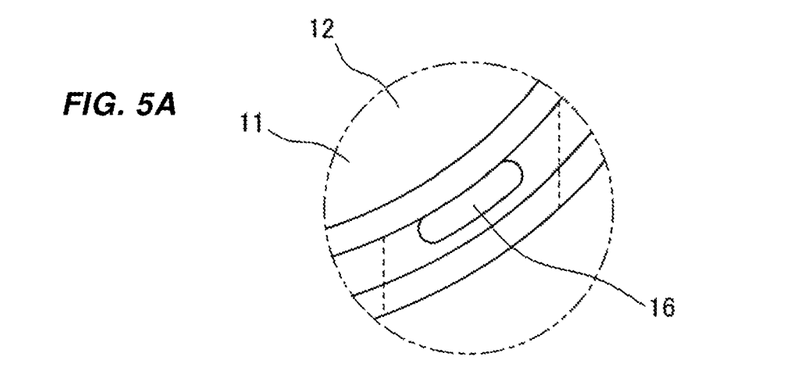
FIGS. 5A to 5C are enlarged plan views of an anchor shape included in the solenoid.
Figure 5B:
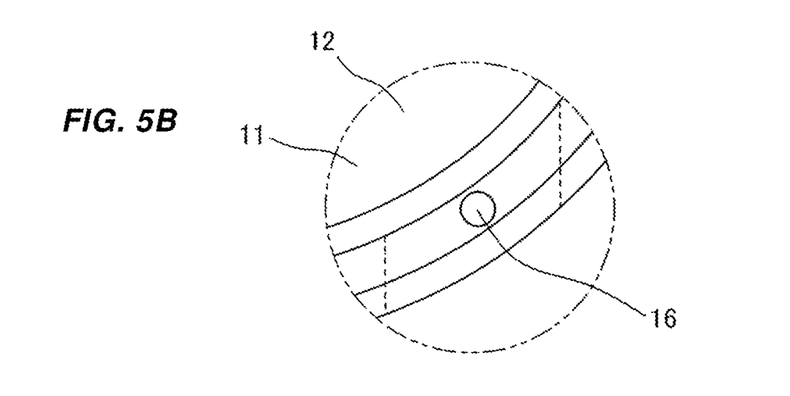

The planar shape of each hole 16 is not limited to a specific shape, and may be an arc shape as illustrated in FIG. 5A or a circular shape as illustrated in FIG. 5B, for example.

Figure 5C:
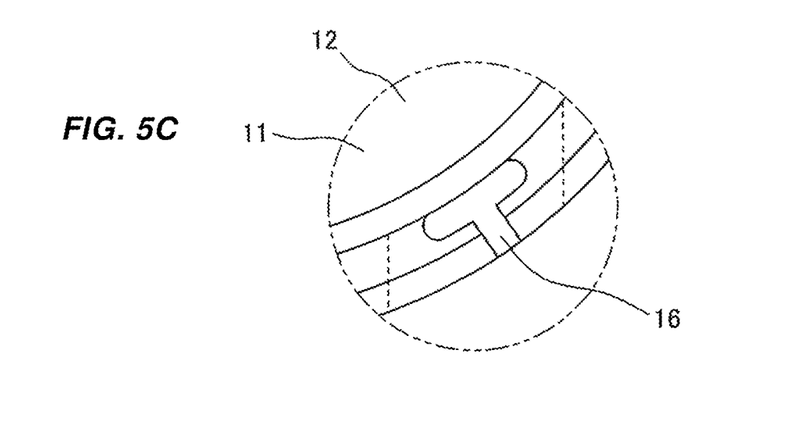

The holes 16 may be open at both the upper surface and the side surface (peripheral surface) of the primary package 11. In this case, the joint strength is further increased. FIG. 5C illustrates an example in this case, where the planar shape of each hole 16 is a T shape, and the tip of the vertical line of the "T" is also open at the side surface (outer circumferential surface) of the primary package 11.

What is claimed is:

1. A solenoid comprising:
a housing including a solenoid body in which a coil is wound around a bobbin, the housing including at least a section that is cylindrical;
a primary package at least partially received within the section of the housing that is cylindrical, a portion of the primary package that is at least partially received within the section of the housing being radially spaced apart from the section of the housing by a first gap, and a flange of the primary package that extends radially outward from the portion is axially spaced apart from the section of the housing by a second gap that communicates with the first gap; and
a secondary package that is made of a molding resin, covers the primary package, and is received within at least the second gap and configured to block entry of foreign matter into the housing,
wherein the solenoid includes a connector part for electrifying the coil in addition to the solenoid body, the primary package covers both the solenoid body and the connector part, and
the secondary package covers only a part of the primary package covering the solenoid body.

2. The solenoid according to claim 1, wherein a contact surface between the primary package and the secondary package is contoured to anchor the primary package to the secondary package.

3. The solenoid according to claim 1, wherein the primary package includes a plurality of apertures, and the molding resin of the secondary package is located in the apertures to secure the secondary package to the primary package.

4. The solenoid according to claim 2, wherein the primary package includes a plurality of apertures, and the molding resin of the secondary package is located in the apertures to secure the secondary package to the primary package.

5. The solenoid according to claim 1, wherein the primary package is formed of a resin.

* * * * *